United States Patent [19]
Herron

[11] Patent Number: 5,870,814
[45] Date of Patent: Feb. 16, 1999

[54] METHOD FOR REPLACING A VEHICULAR WHEEL CYLINDER

[75] Inventor: Paul Kenneth Herron, Camarillo, Calif.

[73] Assignee: Ralph D. Chabot, Camarillo, Calif.

[21] Appl. No.: 939,187

[22] Filed: Sep. 29, 1997

[51] Int. Cl.⁶ .................................................. B23P 6/00
[52] U.S. Cl. ...................... 29/402.08; 29/426.6; 29/239; 29/256; 254/100
[58] Field of Search ................... 29/239, 256, 402.08, 29/426.6; 254/100, 10.5

[56] References Cited

U.S. PATENT DOCUMENTS

| | | | |
|---|---|---|---|
| 139,157 | 5/1873 | Jackson et al. | 254/100 |
| 163,791 | 5/1875 | Livingstone | 254/100 |
| 251,698 | 1/1882 | Coats et al. | 254/100 |
| 670,585 | 3/1901 | Fowler | 254/100 |
| 1,540,873 | 6/1925 | Bergh | 254/100 |
| 2,476,533 | 11/1949 | Boyd | 29/286 |
| 3,540,698 | 11/1970 | McFarland et al. | 254/100 |
| 3,552,528 | 1/1971 | Seip | 188/79.5 |
| 4,673,069 | 6/1987 | Staub, Jr. | 188/331 |
| 4,914,940 | 4/1990 | Hebert | 29/239 |
| 5,020,204 | 6/1991 | Desair | 254/100 |
| 5,036,573 | 8/1991 | Congdon | 254/10.5 |
| 5,087,019 | 2/1992 | Peabody et al. | 29/239 |
| 5,141,214 | 8/1992 | Munoz et al. | 269/254 |

*Primary Examiner*—David P. Bryant
*Attorney, Agent, or Firm*—Ralph D. Chabot

[57] ABSTRACT

A method for removing a defective vehicular wheel cylinder without requiring removal of the brake shoes and various springs of the drum brake system which remain attached to the brake assembly.

1 Claim, 2 Drawing Sheets

METHOD FOR REPLACING A VEHICULAR WHEEL CYLINDER

TECHNICAL FIELD

This invention relates to the automotive repair industry and in particular to the removal and replacement of wheel cylinders incorporated in drum-style brake systems.

BACKGROUND-DESCRIPTION OF PRIOR ART

Drum-style brake systems are well known in the prior art. The brake system is operated by hydraulic pressure which forces hydraulic pistons located in a wheel cylinder to extend away from the cylinder body in opposite directions. Each piston is connected to a respective brake shoe having brake lining material which faces the interior circumferential surface of the drum. As the pistons are forced outward, the shoes are displaced outward into frictional contact with the brake drum. An arrangement of springs are utilized to return the shoes to their original position once the hydraulic pressure exerted upon the wheel cylinder is released. Some brake systems have further utilized spring tension principles to "self-adjust" or cause the shoes and lining material to be set in place in a closer spacial relationship to the drum surface.

Over time, wheel cylinders begin to leak hydraulic brake fluid from normal wear. Typically, when changing a hydraulic wheel cylinder, a mechanic will remove the brake shoes, springs and all associated hardware, even in cases where the brake linings were not in need of replacement. The job entailed additional labor to remove the associated components and hardware instead of simply replacing the failed part.

SUMMARY OF THE INVENTION

One object of the invention is that it can be utilized to efficiently remove a defective wheel cylinder without requiring the removal of brake shoes, springs and other associated hardware. The time for removal and replacement of the defective wheel cylinder is substantially reduced.

Another object of the invention to provide a device which is inexpensive to manufacture and available to the general public.

The device must be capable of withstanding the compressive force exerted by the system springs when attempting to radially displace the brake shoes from one another. My invention requires that it be made of a rigid material, preferably steel.

The device is comprised of a rigid elongated hollow body and a displaceable stem. The hollow body has on one end an outward facing convex surface area for frictionally engaging the backside of a brake shoe. The other end of the hollow body has an aperture for receiving in threadable engagement a stem. The stem also has an outward facing convex area on one end for frictionally engaging the backside of a brake shoe. Preferably, each convex surface area is knurled to enhance frictional engagement when the device is utilized.

The device is inserted in its closed or retracted state, as near to the center of the brake shoes as possible, and expanded while in position. As the stroke or length of the tool is increased (by rotating the elongated cylindrical body), the brake springs begin to increase in tension and the shoes are forced away from one another. As the shoes are forced apart, the force upon the wheel cylinder pistons as applied by the brake shoes diminish. When all the force is removed from the pistons, the brake fluid feed line to the wheel cylinder and the mounting bolts can be removed and the failed cylinder detached from the back plate assembly. A replacement cylinder can then be mounted to the back plate assembly. Once mounted, the cylinder can be connected to the brake fluid feed line. Finally, the stroke of the tool is slowly retracted, until the pistons of the replacement wheel cylinder are in engagement with the brake shoes. The tool is thereafter removed and can be reused.

Preferably, the exterior of the hollow cylindrical body has a hexagonal exterior surface around at least one portion of its circumferential area. Since there can be considerable compressive force to overcome, rotating my invention by hand may be extremely difficult or impossible. The hexagonal surface will permit the use of a tool such as an open-ended wrench to apply additional torque required to overcome spring tension being exerted upon the brake shoes.

In an alternative embodiment, the hollow cylindrical body has a spring disposed within. One end of the hollow body has an aperture for receiving in threadable engagement a stem as described above. On the other end of the hollow body is a removable endplug which has an outward facing convex head with a knurled surface area. The endplug has a base which has a smaller diameter than the inside diameter of the hollow cylinder and can be partially inserted therein. The purpose of the spring is to provide a minimal amount of resistant force to frictionally engage the tool in proper position so that the user's hands may then be free to properly apply any required force using a wrench as described above.

DETAILED DESCRIPTION OF THE PREFERRED EMBODIMENT

Figure 1:
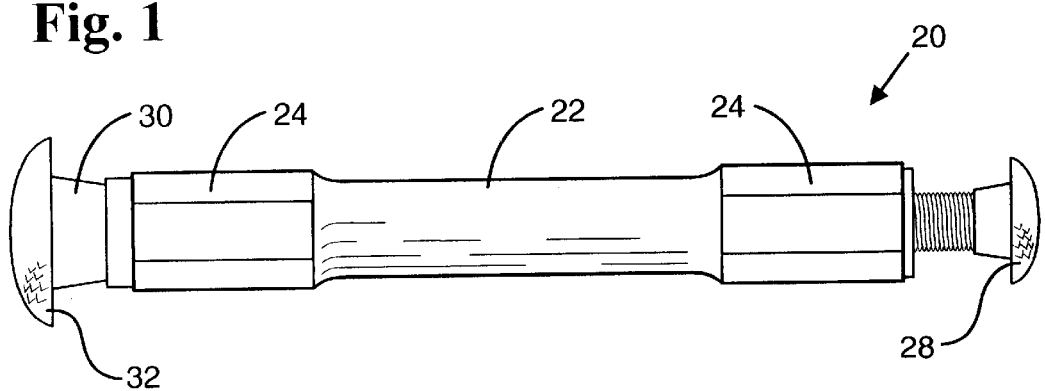
FIG. 1 is a front view of the invention.
Figure 2:
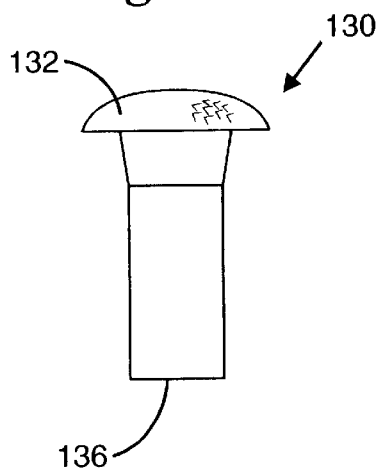
FIG. 2 is a front view of the end plug of the alternative embodiment.
Figure 3:
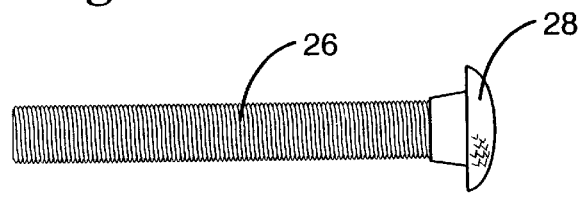
FIG. 3 is a front view of a threaded stem.
Figure 4:
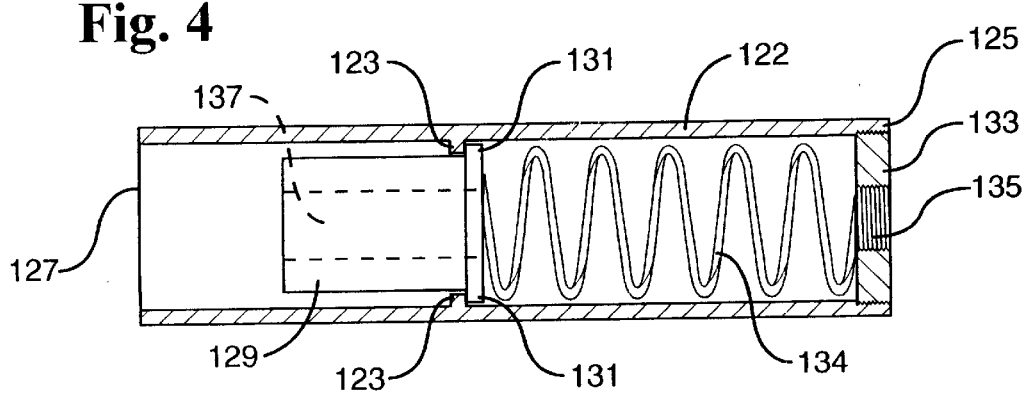
FIG. 4 is a front view of hollow body of the alternative embodiment.
Figure 5:
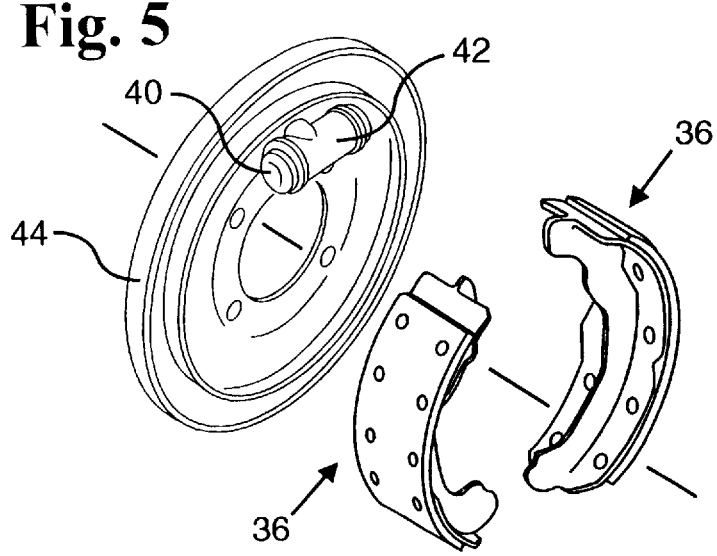
FIG. 5 is an exploded view of a drum brake system.

The assembled device 20 is illustrated in FIG. 1. Device 20 has a hollow cylindrical body 22 having hexagonal surface areas 24 about its circumference. A threaded stem 26 having a head 28 threadably engages body 22. Stem 26 may be retracted into or extended from body 22 by rotation of body 22 about stem 26. Head 28 has a convex outward facing knurled surface area. On the body 22 opposite the threadable engagement to stem 26 is an end portion 30 having a head 32 of same configuration as stem head 28.

In an alternative embodiment, the device is comprised of six parts. Hollow body 122 has an interior lip 123 which is positioned substantially equidistant from plate end 125 and plug end 127. A hollow cylinder 129 having an exterior circumferential lip 131 on one end is inserted (exterior lip last) into body 122 through plate end 125. Exterior lip 131 has an outside diameter less than the inside diameter of body 122 but greater than the inside diameter of interior lip 123. Hollow cylinder 129 can travel within body 122 until exterior lip 131 contacts interior lip 123. A spring 134 is inserted into body 122 between cylinder 129 and plate end 125. An end plate 133 is attached to plate end 125, preferably by threadable engagement. End plate 133 has a central aperture 135 which has female threads for threadably engaging stem 26. Once end plate 133 is attached to body 122, spring 134 disposed within body 122 exerts a force onto hollow cylinder 129 biasing it against interior lip 123. Stem 26 can be screwed into body 122. Preferably, hollow cylinder has an aperture 137 for receiving stem 26 as it is screwed into body 122. End plug 130 has an outward facing knurled convex head 132 and a base 136 which can be inserted into plug end 127. Hand force can be used to displaced end plug 130 partially into body 122 by displacing hollow cylinder 129 against spring 134. The advantage of this function will now be described.

Device 20 is positioned between the inside surfaces of the opposing shoes 36 of a drum-brake system. Body 122 is rotated about stem 26 to a slightly larger diameter than the distance between the brake shoes. End plug 130 is thereafter partially depressed by hand into body 122 and positioned between the brake shoes. As the depressing hand force is released, spring 134 displaces end plug 130 outward causing the knurled surfaces on head 132 and head 28 to frictionally engage the back side of the brake shoes. Although not sufficient to appreciably displace the brake shoes away from one another, the spring loaded embodiment allows the proper positioning of device 20 and maintains the correct position while a user can use his hands for rotating the device without worry about inadvertent disengagement.

Figure 6:
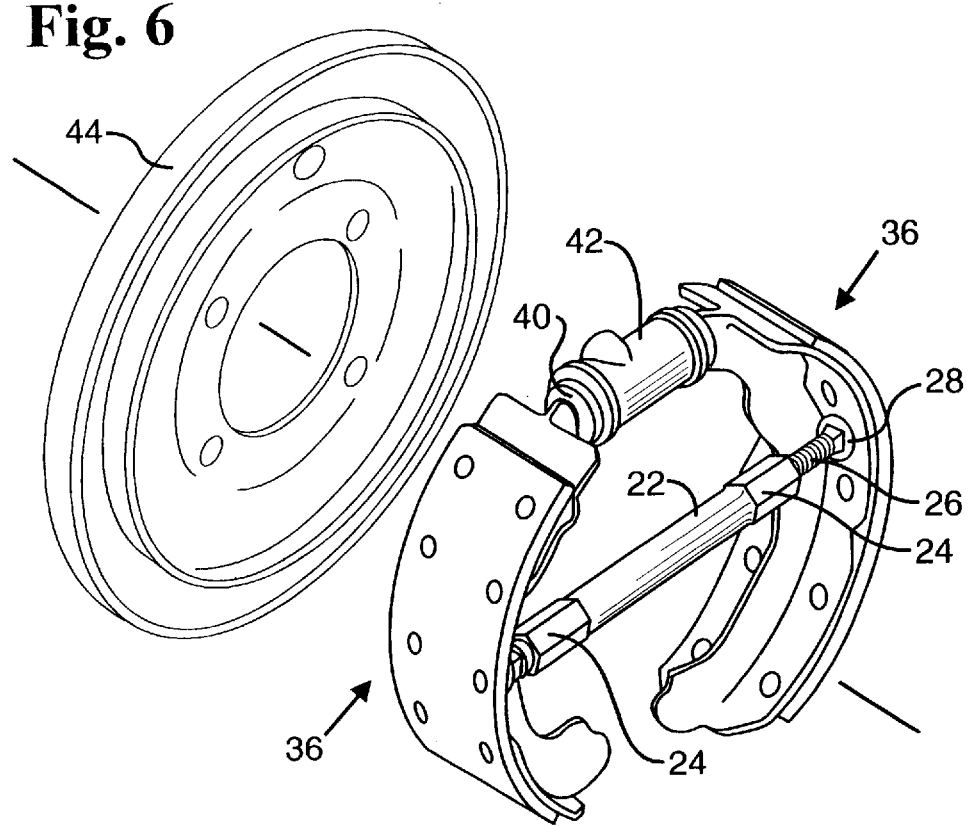
FIG. 6 is a view of the invention in operational contact with a drum brake system.

As illustrated in FIG. 6, device 20 is used as follows: The outside surface of body 22 is rotated about its longitudinal axis in a direction to extend threaded stem 26. As stem 26 is extended, a separation force is being equally applied to both brake shoes. Device 20 is extended until each brake shoe 36 is no longer in contact with the pistons 40 of wheel cylinder 42. The hydraulic brake fluid line (not shown) to wheel cylinder 42 can be disconnected as well as any mounting bolts (not shown). Cylinder 42 can then be removed from the backing plate assembly 44 and replaced. After mounting a replacement cylinder to backing plate assembly 44, body 22 is rotated in the opposite direction, thereby retracting stem 26. This is continued until the wheel cylinder pistons 40 are in contact with a respective brake shoe and device 20 can thereafter be removed.

Other features and advantages of the invention will become apparent to those skilled in the art upon review of the following detailed description and claims.

I claim:

1. In a hydraulic vehicle braking system utilizing drum brakes having: at least one axle hub; each axle hub having a drum, a wheel cylinder, an axle backing plate and a pair of brake shoes; each wheel cylinder having a pair of pistons with each piston frictionally engaging a respective brake shoe; tubing for communicating hydraulic pressure to each wheel cylinder; and a bias means for urging each pair of brake shoes away from frictional engagement with the drum; a method for replacing a wheel cylinder without disengagement of the bias means, comprising the steps of:

removing the drum from the axle hub;

displacing temporarily the pair of brake shoes away from one another to overcome the bias means thereby disengaging the brake shoes from frictional engagement with the pistons of the wheel cylinder;

disconnecting the tubing connected to the wheel cylinder;

removing the wheel cylinder from the axle backing plate;

attaching a replacement wheel cylinder to the axle backing plate;

connecting the tubing to the replacement wheel cylinder;

allowing the bias means to displace the brake shoes back into frictional engagement with the pistons of the replacement wheel cylinder; and reinstalling the drum to the vehicle axle.

\* \* \* \* \*